(12) United States Patent
Tzikas et al.

(10) Patent No.: US 6,451,072 B1
(45) Date of Patent: Sep. 17, 2002

(54) REACTIVE DYES, PROCESS FOR THEIR PREPARATION AND THEIR USE

(75) Inventors: Athanassios Tzikas, Pratteln (CH); Rolf Deitz, Grenzach-Wyhlen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/535,916

(22) Filed: Mar. 24, 2000

(30) Foreign Application Priority Data

Mar. 30, 1999 (EP) .............................. 99810271

(51) Int. Cl.$^7$ ............................ D06P 3/66; C09B 62/01; C09B 62/09; C09B 62/513

(52) U.S. Cl. ...................... 8/549; 8/918; 8/687; 8/688; 534/635; 534/637; 534/642

(58) Field of Search ............................ 8/549, 918, 687, 8/688, 637; 534/617, 635, 582, 598, 642, 637

(56) References Cited

U.S. PATENT DOCUMENTS

| | | | |
|---|---|---|---|
| 4,065,254 A | * | 12/1977 | Buhler et al. |
| 5,412,078 A | * | 5/1995 | Eizenhofer et al. |
| 5,596,083 A | * | 1/1997 | Kunimi et al. |

FOREIGN PATENT DOCUMENTS

| | | | |
|---|---|---|---|
| CH | 563495 | * | 5/1975 |
| EP | 0486176 | | 5/1992 |
| EP | 0679696 | | 11/1995 |
| JP | 57161175 | | 10/1982 |
| JP | 59-168066 | * | 9/1984 |
| WO | 97/27249 | | 7/1997 |

OTHER PUBLICATIONS

Derwent Abstract 95-367322/48 for EP 0679696 (1995).
Derwent Abstr. 82-96633 E/45 for JP 57161175 (1982).
Patent Abstracts of Japan Publication No. 58168660, Publication Date Oct. 1983.

* cited by examiner

Primary Examiner—Margaret Einsmann
(74) Attorney, Agent, or Firm—Kevin T. Mansfield

(57) ABSTRACT

Reactive dyes of formula (1)

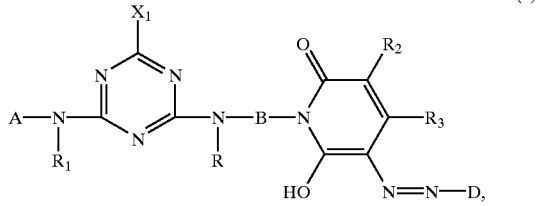

wherein
A is phenyl or naphthyl, each of which is unsubstituted or substituted by halogen, $C_1$–$C_4$alkyl, $C_1$–$C_4$alkoxy, carboxy, sulfo or a fiber-reactive group of formula (2a), (2b), (2c), (2d) or (2e)

$$-SO_2-Y \qquad (2a),$$

$$-NH-CO-(CH_2)_l-SO_2-Y \qquad (2b),$$

$$-CONH-(CH_2)_m-SO_2-Y \qquad (2c),$$

$$-NH-CO-CH(Hal)-CH_2Hal \qquad (2d)$$

or $$-NH-CO-C(Hal)=CH_2 \qquad (2e),$$

B is an aliphatic linking group,
D is the radical of a diazo component of the benzene or naphthalene series,
$R_1$ is hydrogen or unsubstituted or substituted $C_1$–$C_4$alkyl,
$R_2$ is hydrogen, cyano, carbamoyl or sulfomethyl,
$R_3$ is hydrogen or $C_1$–$C_4$alkyl,
R is hydrogen or unsubstituted or substituted $C_1$–$C_4$alkyl or corresponds to a radical of formula (3)

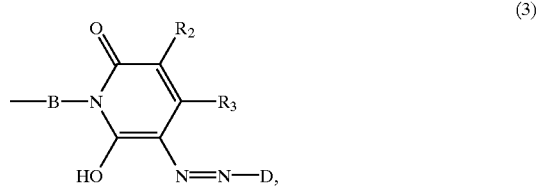

wherein B, D, $R_2$ and $R_3$ have the meanings cited above,
$X_1$ is halogen, hydroxy, $C_1$–$C_4$alkoxy, unsubstituted or substituted $C_1$–$C_4$alkylthio or amino, or a N-heterocycle which may contain additional heteroatoms,
Hal is chloro or bromo,
Y is vinyl or a $-CH_2-CH_2-U$ radical, U is a group a which is removable with alkali, and l and m are each independently of the other the number 2, 3 or 4,
with the proviso that A and D are not simultaneously a phenyl radical which is substituted by the radical of formula (2a) if R is β-hydroxyethyl or β-sulfatoethyl and $R_1$ is $C_1$–$C_4$alkyl, are particularly suitable for dyeing cotton and give dyeings having very good allround fastness properties.

15 Claims, No Drawings

REACTIVE DYES, PROCESS FOR THEIR PREPARATION AND THEIR USE

The present invention relates to novel reactive dyes, to processes for their preparation and to their use for dyeing or printing fibre materials.

The practice of dyeing with reactive dyes has given rise in recent times to more stringent demands being made on the quality of the dyeings and on the economy of the dyeing process. For this reason, there is still a need for novel reactive dyes with improved properties, especially application properties.

Dyeing today calls for reactive dyes which have sufficient substantivity and which at the same time have good washing off properties with respect to unfixed dye. In addition, the dyes shall have a good tinctorial yield and high reactivity, and they shall also give, in particular, dyeings with high degrees of fixation. The dyes of the prior art do not meet these requirements in all respects.

This invention therefore has for its object to provide novel improved reactive dyes for dyeing and printing fibre materials and which have the above specified qualities to a high degree. The novel dyes shall be distinguished in particular by excellent fixation yields and superior fibre-dye bond stability, and further they shall have the property of being easily washed off to remove unfixed dye. They shall also produce dyeings with good allround fastness properties, for example lightfastness and wetfastness.

It has been found that this object is substantially achieved with the novel reactive dyes defined below.

This invention thus relates to reactive dyes of formula (1)

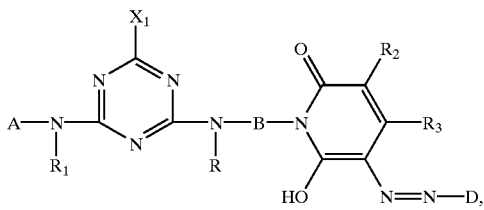

(1)

wherein

A is phenyl or naphthyl, each of which is unsubstituted or substituted by halogen, $C_1$–$C_4$alkyl, $C_1$–$C_4$alkoxy, carboxy, sulfo or a fibre-reactive group of formula (2a), (2b), (2c), (2d) or (2e)

—$SO_2$—Y  (2a),

—NH—CO—$(CH_2)_l$—$SO_2$—Y  (2b),

—CONH—$(CH_2)_m$—$SO_2$—Y  (2c),

—NH—CO—CH(Hal)—$CH_2$Hal  (2d)

or

—NH—CO—C(Hal)=$CH_2$  (2e),

B is an aliphatic linking group,

D is the radical of a diazo component of the benzene or naphthalene series, $R_1$ is hydrogen or unsubstituted or substituted $C_1$–$C_4$alkyl, $R_2$ is hydrogen, cyano, carbamoyl or sulfomethyl, $R_3$ is hydrogen or $C_1$–$C_4$alkyl, R is hydrogen or unsubstituted or substituted $C_1$–$C_4$alkyl or corresponds to a radical of formula (3)

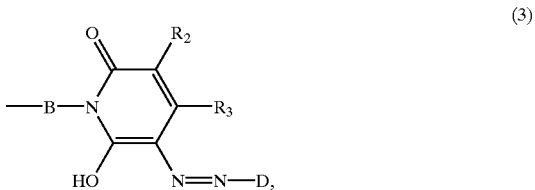

(3)

wherein B, D, $R_2$ and $R_3$ have the meanings cited above, $X_1$ is halogen, hydroxy, $C_1$–$C_4$alkoxy, unsubstituted or substituted $C_1$–$C_4$alkylthio or amino, or a N-heterocycle which may contain additional heteroatoms, Hal is chloro or bromo, Y is vinyl or a —$CH_2$—$CH_2$—U radical, U is a group a which is removable with alkali, and l and m are each independently of the other the number 2, 3 or 4, with the proviso that A and D are not simultaneously a phenyl radical which is substituted by the radical of formula (2a) if R is β-hydroxyethyl or β-sulfatoethyl and $R_1$ is $C_1$–$C_4$alkyl.

The novel dyes of formula (1) are fibre-reactive. Fibre-reactive compounds are to be understood as meaning compounds which are capable of reacting with the hydroxyl groups of the cellulose, amino, carboxy, hydroxy or thiol groups in wool and silk, or with the amino and, optionally, with the carboxy groups of synthetic polyamides with formation of covalent chemical bonds.

In the novel reactive dyes of formula (1) at least one of the radicals A and D contains a fibre-reactive group, or $X_1$ is halogen.

The dyes of formula (1) contain at least one, preferably 2 to 6 and, more preferably, 2 to 4, sulfo groups, which are either in the form of their free acid or, preferably, in the form of their salts. Suitable salts are, for example, the alkali metal salts, alkaline earth metal salts or ammonium salts, the salts of an organic amine, or mixtures thereof. Examples to be mentioned are the sodium, lithium, potassium or ammonium salts, the salt of mono-, di- or tri-ethanolamine, or Na/Li— or Na/Li/$NH_4$ mixed salts.

R and $R_1$ defined as unsubstituted or substituted $C_1$–$C_4$alkyl may be methyl, ethyl, n- or isopropyl or n-, sec-, tert- or isobutyl which is unsubstituted or substituted e.g. by hydroxy, sulfo, sulfato, carboxy, cyano, halogen, $C_1$–$C_4$alkoxycarbonyl or carbamoyl, preferably by hydroxy, sulfo, sulfato or carboxy.

R is preferably hydrogen, unsubstituted or hydroxy-substituted $C_1$–$C_4$alkyl or a radical of formula (3), particularly preferably hydrogen, methyl, ethyl or β-hydroxyethyl or a radical (3) and, very particularly preferably, hydrogen or a radical (3), wherein B, D, $R_2$ and $R_3$ have the meanings cited above. In a very particularly preferred embodiment of this invention, R is a radical of formula (3).

$R_1$ is preferably hydrogen or $C_1$–$C_4$alkyl, particularly preferably hydrogen, methyl or ethyl and, very particularly preferably, hydrogen.

$R_2$ is preferably carbamoyl or sulfomethyl, more preferably carbamoyl.

$R_3$ defined as $C_1$–$C_4$alkyl is, for example, methyl, ethyl, n- or isopropyl or n-, sec-, tert- or isobutyl, preferably methyl or ethyl.

$R_3$ is preferably methyl or ethyl, more preferably methyl.

$R_2$ is preferably carbamoyl or sulfomethyl, more preferably carbamoyl, and $R_3$ is $C_1$–$C_4$alkyl, more preferably methyl.

The aliphatic linking group B is, for example, straight-chain or branched $C_2$–$C_{12}$alkylene which is unsubstituted or substituted by hydroxy, $C_1$–$C_4$alkoxy, sulfato or sulfo and/or interrupted once or several times by —O— or —$NR_4$—, wherein $R_4$ is hydrogen or $C_1$–$C_4$alkyl, preferably hydrogen, methyl or ethyl, particularly preferably hydrogen. B is preferably straight-chain or branched $C_2$–$C_6$alkylene which is unsubstituted or substituted by hydroxy, sulfo or sulfato and, particularly preferably, unsubstituted straight-chain or branched $C_2$–C6alkylene. Examples of particularly preferred linking groups B are 1,2-ethylene, 1,3-propylene, 2-hydroxy-1,3-propylene, 1,4-butylene, 2-methyl-1,5-pentylene, 1,6-hexylene, particularly preferably 1,2-propylene and 1,2-ethylene and, very particularly preferably, 1,2-ethylene.

$X_1$ defined as halogen is e.g. fluoro, chloro or bromo.

$X_1$ defined as $C_1$–$C_4$alkoxy is suitably, for example, methoxy, ethoxy, n-propoxy, isopropoxy, n-butoxy or isobutoxy, preferably methoxy or ethoxy and, particularly preferably, methoxy.

$X_1$ defined as $C_1$–$C_4$alkylthio is, for example, methylthio, ethylthio, n-propylthio, isopropylthio or n-butylthio, preferably ethylthio or n-propylthio. The cited radicals are unsubstituted or substituted in the alkyl moiety by hydroxy, carboxy or sulfo. The substituted radicals are preferred.

$X_1$ defined as unsubstituted or substituted amino is amino which is unsubstituted or substituted at the N-atom, for example the following radicals:

N-mono- or N,N-di-$C_1$–$C_4$alkylamino, which encompasses both the unsubstituted radicals and the radicals which are substituted in the alkyl moiety, for example by $C_1$–$C_4$alkoxy, hydroxy, carboxy, sulfo or sulfato; the radicals substituted in the alkyl moiety being preferred;

$C_5$–$C_7$cycloalkylamino, which encompasses both the unsubstituted radicals and the radicals which are substituted in the cycloalkyl ring, for example by $C_1$–$C_4$alkyl, preferably methyl; of such radicals the corresponding cyclohexyl radicals are preferred;

phenylamino or N—$C_1$–$C_4$alkyl-N-phenylamino, which encompasses both the unsubstituted radicals and the radicals which are substituted in the phenyl ring, for example by $C_1$–$C_4$alkyl,
$C_1$–$C_4$alkoxy, halogen, carboxy or sulfo; these radicals are preferably unsubstituted or sulfo-substituted in the phenyl ring.

$X_1$ defined as a N-heterocycle which may contain further heteroatoms is suitably, for example, morpholino or piperidin-1-yl.

$X_1$ is preferably fluoro or chloro.

The group U which may be removed with alkali is suitably, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—N($C_1$–$C_4$alkyl)$_2$. U is preferably a group of formula —Cl, —$OSO_3H$, —$SSO_3H$, —OCO—$CH_3$, —OCO—$C_6H_5$ or —$OPO_3H_2$, more preferably —Cl or —$OSO_3H$ and, particularly preferably —$OSO_3H$.

Examples of suitable radicals Y are correspondingly vinyl, β-bromo- or β-chloroethyl, β-acetoxyethyl, β-benzoyloxyethyl, β-phosphatoethyl, β-sulfatoethyl and β-thiosulfatoethyl. Y is preferably vinyl, β-chloroethyl or β-sulfatoethyl and, more preferably vinyl or β-sulfatoethyl.

Hal is preferably bromo.

l and m are each independently of the other preferably the number 2 or 3.

Particularly preferably, l is the number 3 and m is the number 2.

Substituents which are customary in dyes are suitable for D. The following examples may be mentioned: $C_1$–$C_4$alkyl, meaning methyl, ethyl, n- or isopropyl, n-, iso-, sec- or tert-butyl; $C_1$–$C_4$alkoxy, meaning methoxy, ethoxy, n- or isopropoxy or n-, iso-, sec- or tert-butoxy; hydroxy-$C_1$–$C_4$alkoxy; phenoxy; $C_2$–$C_6$alkanoylamino which is unsubstituted or substituted in the alkyl moiety by hydroxy or $C_1$–$C_4$alkoxy, for example acetylamino, hydroxyacetylamino, methoxyacetylamino or propionylamino; benzoylamino which is unsubstituted or substituted in the phenyl moiety by hydroxy, sulfo, halogen, $C_1$–$C_4$alkyl or $C_1$–$C_4$alkoxy; $C_1$–$C_6$alkoxycarbonylamino which is unsubstituted or substituted in the alkyl moiety by hydroxy, $C_1$–$C_4$alkyl or $C_1$–$C_4$alkoxy; phenoxycarbonylamino which is unsubstituted or substituted in the phenyl moiety by hydroxy, $C_1$–$C_4$alkyl or $C_1$–$C_4$alkoxy; amino; N—$C_1$–$C_4$alkyl- or N,N-di-$C_1$–$C_4$alkylamino which unsubstituted or substituted in the alkyl moiety by hydroxy, $C_1$–$C_4$alkoxy, carboxy, cyano, halogen, sulfo, sulfato, phenyl or sulfophenyl, for example methylamino, ethylamino, N,N-dimethylamino, N,N-diethylamino, β-cyanoethylamino, β-hydroxyethylamino, N,N-di-β-hydroxyethylamino, β-sulfoethylamino, γ-sulfo-n-propylamino, β-sulfatoethylamino, N-(3-sulfobenzyl)amino, N-ethyl-N-(3-sulfobenzyl)amino, N-(β-sulfoethyl)-N-benzylamino; cyclohexylamino; N-phenylamino or N-$C_1$–$C_4$alkyl-N-phenylamino which is unsubstituted or substituted in the phenyl moiety by nitro, $C_1$–$C_4$alkyl, $C_1$–$C_4$alkoxy, carboxy, halogen or sulfo; $C_1$–$C_4$alkoxycarbonyl, e.g. methoxy- or ethoxycarbonyl; trifluoromethyl; nitro; cyano; halogen, generally meaning e.g. fluoro, bromo or, preferably, chloro; ureido; hydroxy; carboxy; sulfo; sulfomethyl; carbamoyl; N—$C_1$–$C_4$alkylcarbamoyl, such as N-methylcarbamoyl or N-ethylcarbamoyl; carbamido; sulfamoyl; N—$C_1$–$C_4$alkylsulfamoyl, such as N-methylsulfamoyl or N-ethylsulfamoyl; N-phenylsulfamoyl or N—$C_1$–$C_4$alkyl-N-phenylsulfamoyl which is unsubstituted or substituted in the phenyl moiety by sulfo or carboxy; $C_1$–$C_4$alkylsulfonyl, such as methyl- or ethylsulfonyl.

Suitable substituents for D are also fibre-reactive radicals.

Fibre-reactive radicals for D are, for example, the radicals of formula (2a), (2b), (2c), (2d) or (2e), wherein Y, Hal, l and m have the meanings and preferred meanings cited above, or (2f) or (2g)

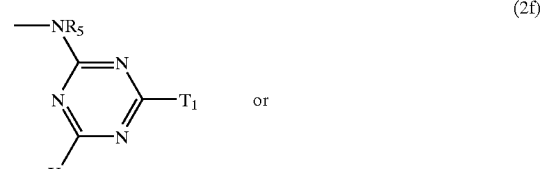

(2f)

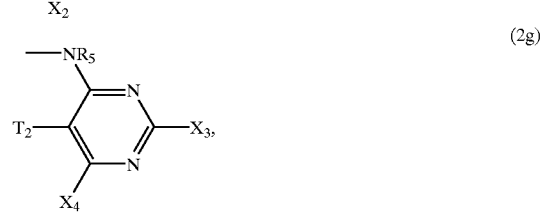

(2g)

wherein
$X_2$ is halogen, 3-carboxypyridin-1-yl or 3-carbamoylpyridin-1-yl;
$T_1$ has each independently of one another the meaning of $X_2$, a substituent which is not fibre-reactive or a fibre-reactive radical of formula (4a), (4b), (4c), (4d) or (4e)

—NH—(CH₂)₂₋₃—SO₂Y (4a),

—NH—(CH₂)₂₋₃—O—(CH₂)₂₋₃—SO₂Y (4b),

—NH-arylene-SO₂—Y (4c),

—NH-arylene-CO—NH—(CH₂)₂₋₃—SO₂—Y (4d)

or

—NH-arylene-NH—CO—Y₁ (4e), wherein $R_5$ is hydrogen or $C_1$–$C_4$alkyl, arylene is a phenylene or naphthylene radical which is unsubstituted or substituted by sulfo, carboxy, $C_1$–$C_4$alkyl, $C_1$–$C_4$alkoxy or halogen, $T_2$ is hydrogen, cyano or halogen, $X_3$ is halogen or $C_1$–$C_4$alkylsulfonyl, $X_4$ is halogen or $C_1$–$C_4$alkyl, Y has the meanings and preferred meanings cited above, $Y_1$ is a group —CH(Hal)—CH₂Hal or —C(Hal)=CH₂, and Hal has the meanings and preferred meanings cited above.

$R_5$ defined as $C_1$–$C_4$alkyl is, for example, methyl, ethyl, n- or isopropyl, n-, iso- or tert-butyl.

$R_5$ is preferably hydrogen, methyl or ethyl and, particularly preferably, hydrogen.

$T_1$ defined as a non-reactive substituent may be, for example, hydroxy; $C_1$–$C_4$alkoxy; $C_1$–$C_4$–alkylthio which is unsubstituted or substituted by hydroxy, carboxy or sulfo; amino; amino which is mono- or disubstituted by $C_1$–$C$, alkyl, wherein the alkyl may be further substituted e.g. by sulfo, sulfato, hydroxy, carboxy or phenyl, preferably by sulfo or hydroxy and may be interrupted by an —O— radical; cyclohexylamino; morpholino; N—$C_1$–$C_4$alkyl-N-phenylamino or phenylamino or naphthylamino, wherein phenyl or naphthyl is unsubstituted or substituted by e.g. $C_1$–$C_4$alkyl, $C_1$–$C_4$alkoxy, carboxy, sulfo or halogen.

Examples of suitable non-reactive substituents $T_1$ are amino, methylamino, ethylamino, β-hydroxyethylamino, N,N-di-β-hydroxyethylamino, β-sulfoethylamino, cyclohexylamino, morpholino, 2-, 3- or 4-chlorophenylamino, 2-, 3- or 4-methylphenylamino, 2-, 3- or 4-methoxyphenylamino, 2-, 3- or 4-sulfophenylamino, disulfophenylamino, 2-, 3- or 4-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or isopropoxy and hydroxy.

As a radical which is not fibre-reactive, $T_1$ is preferably $C_1$–$C_4$alkoxy; $C_1$–$C_4$alkylthio which is unsubstituted or substituted by hydroxy, carboxy or sulfo; hydroxy, amino; N-mono- or N,N-di-$C_1$–$C_4$alkylamino which is unsubstituted or substituted in the alkyl moiety by hydroxy, sulfato or sulfo; morpholino; phenylamino or N—$C_1$–$C_4$alkyl-N-phenylamino which is unsubstituted or substituted in the phenyl ring by sulfo, carboxy, acetylamino, chloro, methyl or methoxy, wherein the alkyl is unsubstituted or substituted by hydroxy, sulfo or sulfato, or naphthylamino which is unsubstituted or substituted by 1 to 3 sulfo groups.

Particularly preferred radicals $T_1$ which are not fibre-reactive are amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, morpholino, 2-, 3- or 4-carboxyphenylamino, 2-, 3- or 4-sulfophenylamino or N—$C_1$–$C_4$alkyl-N-phenylamino.

$X_2$ defined as halogen is, for example, fluoro, chloro or bromo and, preferably, chloro or fluoro.

Arylene is preferably a phenylene radical, particularly preferably a 1,3- or 1,4-phenylene radical which is unsubstituted or substituted e.g. by sulfo, methyl or methoxy.

$T_2$, $X_3$ and $X_4$ defined as halogen are, for example, fluoro, chloro or bromo, preferably chloro or fluoro.

$X_3$ defined as $C_1$–$C_4$alkylsulfonyl is, for example, ethylsulfonyl or methylsulfonyl, preferably methylsulfonyl.

$X_4$ defined as $C_1$–$C_4$alkyl is, for example, methyl, ethyl, n- or isopropyl, n-, iso- or tert-butyl, preferably methyl.

$X_3$ and $X_4$ are preferably each independently of the other chloro or fluoro.

$T_2$ is preferably cyano or chloro.

In the case of the radicals of formulae (4a) and (4b), Y is preferably β-chloroethyl. In the case of the radicals of formulae (4c) and (4d), Y is preferably vinyl or β-sulfatoethyl.

Suitable fibre-reactive radicals D are preferably radicals of formula (2a), (2b), (2c), (2d), (2e), (2f) or (2g), wherein Y is vinyl, β-chloroethyl or β-sulfatoethyl, Hal is bromo, l and m are each independently of the other the number 2 or 3, $R_5$ is hydrogen, and $X_2$, $X_3$ and $X_4$ are each independently of one another chloro or fluoro, $T_1$ is a fibre-reactive radical of formula (4c') or (4d'),

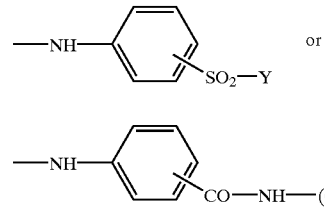

preferably (4c'), wherein Y is vinyl or β-sulfatoethyl, and $T_2$ is cyano or chloro.

Those novel reactive dyes are preferred, wherein at least one of the radicals A and D contains a fibre-reactive group.

D is preferably a phenyl or naphthyl radical which may be further substituted by substituents customarily used for dyes, preferably by $C_1$–$C_4$alkyl, $C_1$–$C_4$alkoxy, halogen, sulfo, nitro, carboxy or a fibre-reactive radical of formula (2a), (2b), (2c), (2d), (2e), (2f) or (2g), the above meanings and preferred meanings applying to the cited fibre-reactive radicals.

If D carries one or more than one non-reactive substituent, then it is preferably sulfo, $C_1$–$C_4$alkyl, $C_1$–$C_4$alkoxy or halogen and, particularly preferably, sulfo, methyl or methoxy.

D defined as a radical of an unsubstituted or substituted diazo component of the benzene or naphthalene series also encompasses monoazo radicals, for example those of formula (5) or (6)

—D*—N=N—K* (5)

or

D*—N=N—K**— (6), preferably of formula (6), wherein D* is the radical of a diazo component of the benzene or naphthalene series, K* is the radical of a coupling component of the benzene, naphthalene, pyrazolone, 6-hydroxypyridone-(2) or acetoacetic acid arylamide series, and K** is the radical of a coupling component of the benzene or naphthalene series, it being possible for D*, K* and K** to carry substituents customarily used in dyes.

Suitable substituents for D*, K* and K** which are not fibre-reactive are preferably $C_1$–$C_4$alkyl or $C_1$–$C_4$alkoxy which may be further substituted by hydroxy, $C_1$–$C_4$alkoxy, sulfo or sulfato; halogen, carboxy, sulfo, nitro, cyano, trifluoromethyl, sulfamoyl, carbamoyl, amino, ureido, hydroxy, sulfomethyl, $C_2$–$C_4$alkanoylamino, $C_1$–$C_4$alkylsulfonylamino; benzoylamino which is unsubstituted or substituted in the phenyl ring by $C_1$–$C_4$alkyl, $C_1$–$C_4$alkoxy, halogen or sulfo, or phenyl which is unsubstituted or substituted by $C_1$–$C_4$alkyl, $C_1$–$C_4$alkoxy, halogen, carboxy or sulfo.

Suitable fibre-reactive substituents for D*, K* and K** are preferably the radicals of formula (2a), (2c), (2d), (2e) or (2f), preferably (2a), the above meanings and preferred meanings applying to the cited radicals.

The monoazo radicals of formula (5) or (6) preferably contain at least one sulfo group.

Preferred monoazo radicals D of formula (6) correspond to the radicals of formula (6a), (6b), (6c), (6d), (6e), (6f), (6g), (6h), (6i) or (6j)

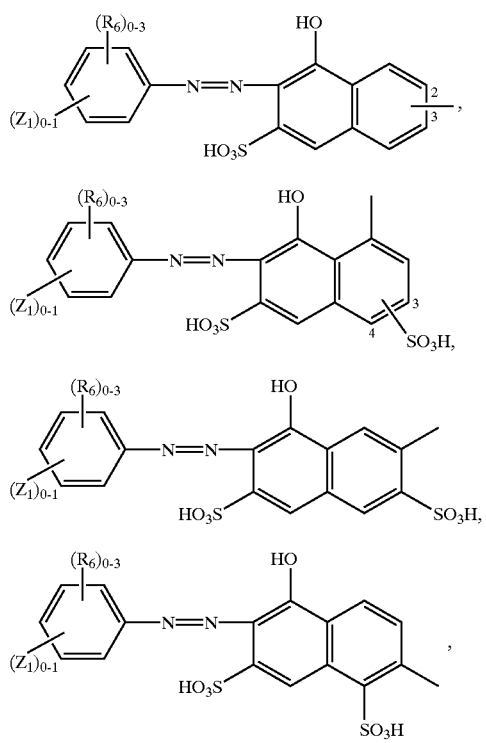

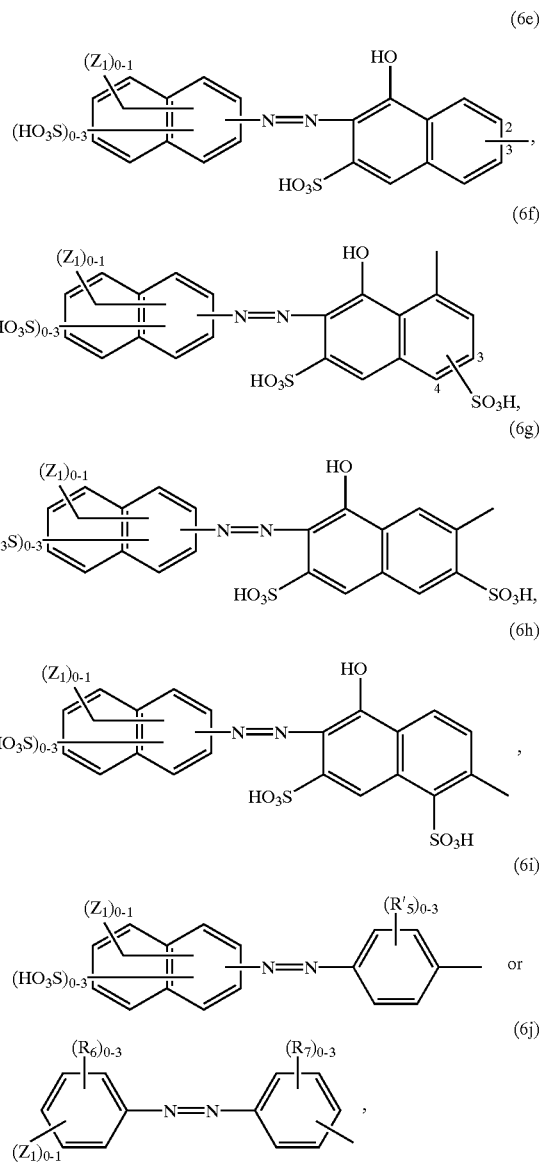

wherein $(R_6)_{0-3}$ is 0 to 3 identical or different substituents from the $C_1$–$C_4$alkyl, $C_1$–$C_4$alkoxy, halogen, carboxy and sulfo group, and $Z_1$ is a fibre-reactive radical of formula (2a), (2c), (2d), (2e) or (2f), preferably (2a), (2c), (2d) or (2e), particularly preferably (2a), the above meanings and preferred meanings applying to the cited fibre-reactive radicals, wherein $(R_6)_{0-3}$ has the above meaning, $(R_7)_{0-3}$ is 0 to 3 identical or different substituents selected from the group consisting of halogen, nitro, cyano, trifluoromethyl, sulfamoyl, carbamoyl, $C_1$–$C_4$alkyl, $C_1$–$C_4$alkoxy which is unsubstituted or substituted by hydroxy, sulfato or $C_1$–$C_4$alkoxy, amino, $C_2$–$C_4$alkanoylamino, ureido, hydroxy, carboxy, sulfomethyl, $C_1$–$C_4$alkylsulfonylamino and sulfo, and $Z_1$ has the meanings and preferred meanings given above.

The numbers at the naphthyl rings of the radicals of formulae (6a), (6b), (6e) and (6f) characterise the possible bonding positions.

Particularly preferred monoazo radicals D of formula (6) correspond to the radicals of formula (6a), (6b), (6c), (6d) or (6j), in particular (6j), the above meanings applying to $(R_6)_{0-3}$, $(R_7)_{0-3}$ and $Z_1$.

Very particularly preferred monoazo radicals D of formula (6) correspond to the radical of formula (6j')

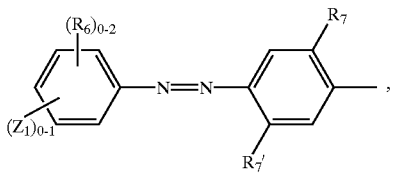
(6j′)

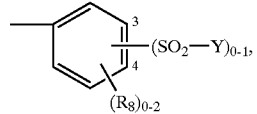
(7a)

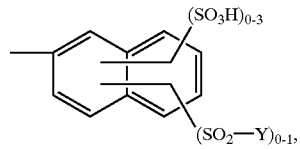
(7b)

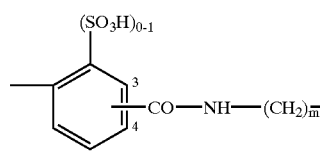
(7c)

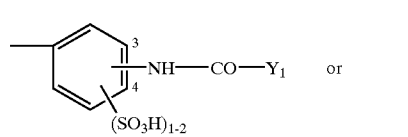
(7d)

wherein $Z_1$ may be a radical of formula (2a), wherein Y is vinyl or β-sulfatoethyl, $(R_6)_{0-2}$ is 0 to 2 identical or different substituents from the $C_1$–$C_4$alkyl, $C_1$–$C_4$alkoxy, halogen, carboxy and sulfo group, preferably methyl, methoxy or sulfo, $R_7$ is hydrogen, sulfo, or $C_1$–$C_4$alkoxy which is unsubstituted or substituted in the alkyl moiety by hydroxy or sulfato, and $R_7′$ is hydrogen, $C_1$–$C_4$alkyl, $C_1$–$C_4$alkoxy, $C_2$–$C_4$alkanoylamino or ureido.

D preferably corresponds to a radical of formula (7)

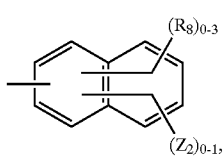
(7)

wherein $(R_8)_{0-3}$ is 0 to 3 identical or different substituents selected from the group consisting of halogen, $C_1$–$C_4$alkyl, $C_1$–$C_4$alkoxy, carboxy and sulfo, $Z_2$ may be a radical of formula (2a), (2b), (2c), (2d), (2e), (2f) or (2g), wherein Y is vinyl, β-chloroethyl or β-sulfatoethyl, Hal is bromo, l and m are each independently of the other the number 2 or 3, $R_5$ is hydrogen, and $X_2$, $X_3$ and $X_4$ are each independently of one another chloro or fluoro, $T_1$ is a fibre-reactive radical of formula (4c′) or (4d′),

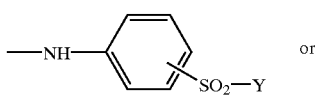
(4c′)

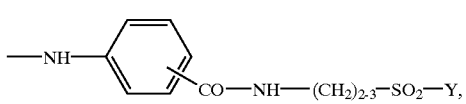
(4d′)

preferably (4c′), wherein Y is vinyl or β-sulfatoethyl, and $T_2$ is cyano or chloro; or a monoazo radical of formula (6j′), wherein $(R_6)_{0-2}$, $R_7$, $R_7′$ and $Z_1$ have the meanings and preferred meanings cited for formula (6j′).

D is particularly preferably a radical of formula (7a), (7b), (7c), (7d) or (7e)

(7e)

wherein $(R_8)_{0-2}$ is 0 to 2 identical or different substituents selected from the halogen, $C_1$–$C_4$alkyl, $C_1$–$C_4$alkoxy and sulfo group, preferably methyl, methoxy and sulfo, $Y_1$ is a radical —CH(Br)—$CH_2$—Br or —C(Br)=$CH_2$, Y is vinyl, β-chloroethyl or β-sulfatoethyl, preferably vinyl or β-sulfatoethyl, and m is the number 2 or 3, preferably 2.

The numbers in the radicals of formulae (7a), (7c), (7d) and (7e) characterise the possible bonding positions of the fibre-reactive radical.

D is preferably a radical of formula (7a), (7b) or (7e).

Suitable radicals A correspond, for example, to a radical of formula (7), wherein $(R_8)_{0-3}$ has the above meanings, and $Z_2$ is a radical of formula (2a), (2b), (2c), (2d) or (2e), the above meanings and preferred meanings applying to Y, Hal, l and m; preferably a radical of formula (7a), (7b), (7c) or (7d), in particular (7a) or (7b), wherein $(R_8)_{0-2}$, Y, $Y_1$ and m have the meanings and preferred meanings given for formulae (7a), (7b), (7c) and (7d).

Suitable radicals A containing no fibre-reactive group are, for example, the following radicals: 2-,3- or 4-sulfophenyl, 2,4-di-sulfophenyl, 2,5-di-sulfophenyl, 1,5-di-sulfonaphth-2-yl or 1,6-di-sulfonaphth-2-yl and, preferably, 2,5-di-sulfophenyl.

A is preferably phenyl which is substituted by 1 to 2 identical or different substituents selected from the methyl, methoxy, sulfo and fibre-reactive group of formula (2a), wherein Y is vinyl or β-sulfatoethyl.

A is particularly preferably 2,5-di-sulfophenyl or 4-(β-sulfatoethylsulfonyl)phenyl.

In a preferred embodiment of this invention, the novel reactive dyes correspond to formula (1a)

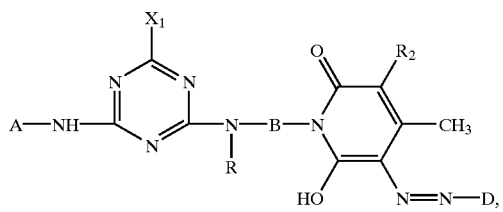

(1a)

wherein

- A is phenyl which is substituted by 1 to 2 identical or different substituents selected from the group consisting of methyl, methoxy, sulfo and fibre-reactive group of formula —SO$_2$—Y (2a), wherein Y is vinyl or β-sulfatoethyl,
- B is straight-chain or branched C$_2$–C$_6$alkylene, preferably ethylene,
- D corresponds to a radical of formula (7a), (7b), (7c), (7d) or (7e), preferably to (7a), (7b) or (7e), wherein (R$_8$)$_{0-2}$, Y, Y$_1$ and m have the above meanings and preferred meanings,
- R$_2$ is carbamoyl or sulfomethyl, preferably carbamoyl,
- R is hydrogen or corresponds to a radical of formula (3a)

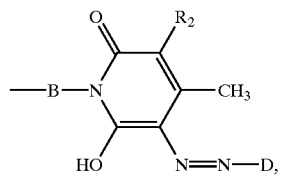

(3a)

wherein B, D and R$_2$ have the meanings and preferred meanings cited above, and X$_1$ is chloro or fluoro.

This invention also relates to a process for the preparation of the novel reactive dyes, which comprises reacting about 1 molar equivalent each of an amine of formula (8)

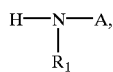

(8)

of a compound of formula (9)

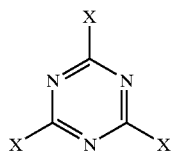

(9)

and of a compound of formula (10)

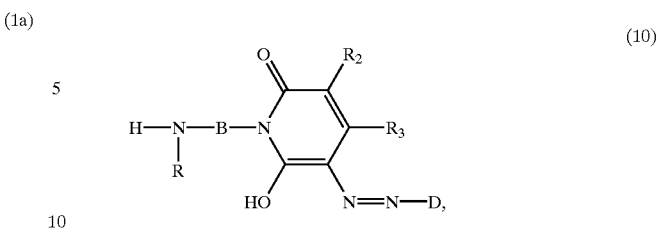

(10)

in any sequence with each other, wherein A, B, D, R$_1$, R$_2$, R$_3$ and R have the above meanings and X is halogen, preferably fluoro or chloro.

The individual process steps described above can be carried out in different order, some of them, where appropriate, also simultaneously, so that different process variants are possible. The reaction is usually carried out in stepwise succession, the sequence of the single reactions between the individual reaction components advantageously being dependent on the particular conditions.

One process variant is that, wherein a compound of formula (8) is condensed with cyanuric chloride or cyanuric fluoride and the product obtained is reacted with a compound of formula (10).

The condensation reactions between the compounds of formulae (8), (9) and (10) are usually carried out in analogy to known processes, normally in aqueous solution at temperatures in the range from e.g. 0 to 35° C. and at a pH from e.g. 3 to 8.5. In the process in it also possible to replace the compound of formula (10) with the corresponding precursor of formula (11)

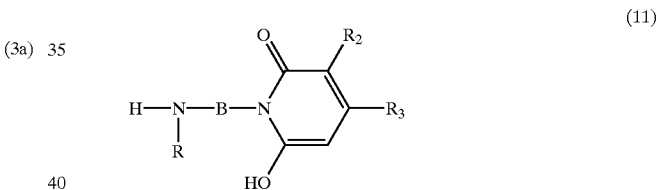

(11)

and to complete the azo chromophore only in the further course of the process by diazotisation of an amine of formula (12)

D—NH$_2$ (12)

and subsequent coupling reaction. B, D, R$_2$, R$_3$ and R have the meanings given above.

The compound of formula (10) is obtained by diazotising an amine of formula (12) and coupling the diazonium compound so obtained to a compound of formula (11).

The diazotisation of the compound of formula (12) and its coupling to the compound of formula (11), or to the condensate obtained according to the above procedure from the compound of formula (11), is carried out in customary manner, for example by diazotising the compound of formula (12) in mineral acidic solution, e.g. in hydrochloric solution, with a nitrite, e.g. sodium nitrite, at a low temperature, e.g. from 0 to 5° C., and then coupling the compound so obtained at a neutral to slightly acid pH, e.g. at a pH from 3 to 8.5, and at low temperatures, e.g. from 0 to 30° C., with the corresponding coupling component.

The compounds of formulae (8), (11) and (12) are known or can be prepared in analogy to known compounds.

The triazinyl compounds obtainable according to the process described above contain a halogen atom which, by reaction with a compound of formula X$_1$—H and at an elevated temperature, preferably from 20 to 70° C., and at a neutral to slightly alkaline pH which, depending on the compound of formula $X_1$—H used, may be e.g. from 7 to 9, can be converted into a $X_1$ group, wherein $X_1$ has the meanings given above except halogen. It is advantageous to use an excess of the compound of formula $X_1$—H.

The end product may also be subjected to a conversion reaction. Such a conversion reaction is, for example, the conversion of a vinylatable reactive group present in A and/or D into its vinyl form by treatment with dilute sodium hydroxide solution, for example the conversion of the β-sulfatoethylsulfonyl or β-chloroethylsulfonyl group into the vinyl sulfonyl radical. Such reactions are known per se.

The novel compounds of formula (1) are suitable as dyes for dyeing or printing a very wide range of materials, such as hydroxyl group-containing or nitrogen-containing fibre materials. Typical examples of such materials are silk, leather, wool, polyamide fibres and polyurethanes. The novel reactive dyes are particularly suitable for dyeing and printing cellulosic fibre materials of all kinds. Such cellulosic fibre materials are, for example, natural cellulose fibres, such as cotton, linen and hemp, as well as cellulose and regenerated cellulose, preferably cotton. The novel reactive dyes are also suitable for dyeing or printing cellulose-containing blended fabrics, e.g. blends of cotton and polyamide fibres or, in particular, cotton/polyester fibre blends.

The novel reactive dyes may applied and fixed to the fibre material in different manners, preferably in the form of aqueous dye solutions and printing pastes. They are suitable both for the exhaust process and for dyeing by the pad-dyeing process, in which the goods are impregnated with aqueous dye solutions which may contain salts, and the dyes are fixed after treatment with alkali, or in the presence of alkali, with or without the application of heat or by being stored for several hours at room temperature. After fixation, the dyeings or prints are thoroughly rinsed with cold and hot water, where appropriate with addition of a dispersant promoting the diffusion of the unfixed dye.

The novel reactive dyes are distinguished by high reactivity, good fixation and excellent build-up. They can therefore be used by the exhaust dyeing process at low dyeing temperatures and require only short steaming times in the pad-steam process. The degrees of fixation are high, and unfixed dye can be readily washed off. The differences between degree of exhaustion and degree of fixation is remarkably small, i.e. the soap loss is very small. The dyes of this invention are also particularly suitable for printing, especially on cotton, and for printing nitrogen-containing fibres, e.g. wool or silk, or blends containing wool or silk.

The dyeings and prints obtained with the dyes of this invention have excellent tinctorial strength and excellent fibre-dye bond stability both in the acid and in the alkaline range, and they also have good lightfastness and excellent wetfastness properties such as fastness to washing, water, sea-water, cross-dyeing and perspiration, as well as good fastness to pleating, ironing and rubbing.

The following Examples illustrate the invention in more detail. Temperatures are given in degrees Celsius, and parts and percentages are by weight, unless otherwise stated. The ratio of parts by weight to parts by volume is the same as that of the kilogram to the liter.

EXAMPLE 1

373 Parts of ethyl cyanoacetate are slowly added to 152 parts of diethylene triamine at 80 to 85° C. After the addition is complete, the resulting ethanol is distilled off under a weak vacuum. Subsequently, 750 parts of water are added to the reaction mixture and this mixture is distilled again under a weak vacuum. After charging the residue with 429 parts of ethyl acetate and 255 parts of a 30% aqueous ammonia solution, the temperature is raised to 90 to 95° C. and the resulting water is distilled off under a weak vacuum. Subsequently, the reaction mixture is added to 1000 parts of an aqueous potassium chloride solution and the precipitated product is subjected to filtration and then dried. This yields 771 parts of a compound of formula

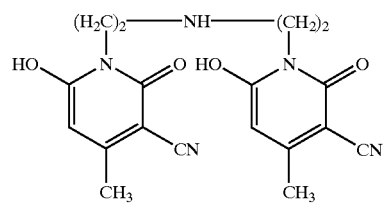

from which the compound of formula

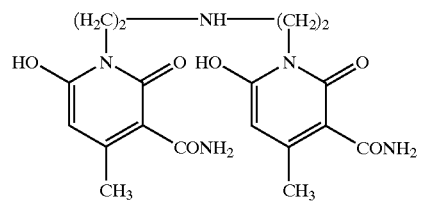

is obtained via saponification with sulfuric acid.

EXAMPLE 2

204 parts of ethyl cyanoacetate are added slowly to 322 parts of ethylenediamine at 80° C. After the addition is complete, the resulting ethanol is distilled off under a weak vacuum. Subsequently, 720 parts of water, 234 parts of ethyl acetate and 162 parts of a 30% aqueous ammonia solution are added to the reaction mixture. The temperature is raised to 90 to 100° C. and the batch is refluxed for 2 hours. Subsequently, the hot reaction mixture is added to 1800 parts of an ice/water mixture. The pH is adjusted to 7 with hydrochloric acid and the product which precipitates at room temperature is subjected to filtration and then dried. This yields 312 parts of a compound of formula

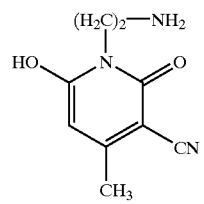

from which the compound of formula

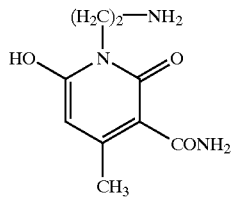

is obtained via saponification with sulfuric acid.

EXAMPLE 3

42.2 Parts of an amine of formula $A_{10}$—$NH_2$, wherein $A_{10}$ is a radical of formula

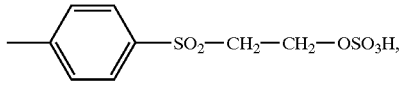

are dissolved in 200 parts of water with addition of a 20% sodium carbonate solution at room temperature and at pH 3.2, and a solution of 1.5 g of disodium hydrogenphosphate in 20 parts of water is then added. 21.3 Parts of cyanuric fluoride are added dropwise to this solution at a temperature below 2° C. and at pH 6.2, which pH is kept constant by addition of a 2 N sodium hydroxide solution. A solution of 48.6 parts of the compound obtained according to Example 1 in 200 parts of water is added to the suspension so obtained, the pH being kept at 6.8 to 7.5 through addition of a 20% sodium carbonate solution and the temperature being kept at 10 to 20° C. To complete the reaction, the mixture is stirred for one hour at room temperature and the pH is then adjusted to 6.2 with 2 N of hydrochloric acid. This yields 700 parts of a solution containing a compound of formula

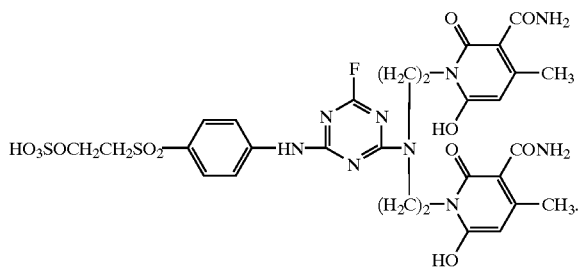

EXAMPLE 4

A neutral solution of 18.2 parts of an amine of formula $D_{10}$—$NH_2$ in 150 parts of water, wherein $D_{10}$ is a radical of formula

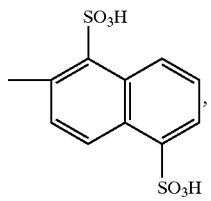

is charged with 15 parts of a 4 N sodium nitrite solution. A mixture consisting of 30 parts of ice/water and 15 parts of conc. hydrochloric acid is added to this solution at 0° C. The reaction mixture is stirred for one hour at 0° C. This mixture is then charged with 175 parts of the solution obtained according to Example 3 at 2 to 6° C., the pH being adjusted with sodium hydrogencarbonate first to 6.2 and then with a 20% sodium carbonate solution to 8.5. To complete the reaction, the mixture is stirred for one hour at 6 to 20° C. and the pH is then adjusted to 6.2 with 2 N hydrochloric acid. The solution so obtained is then freed from salt by dialysis and is concentrated by evaporation, yielding 30.9 parts of a compound which, in the form of the free acid, corresponds to formula (101)

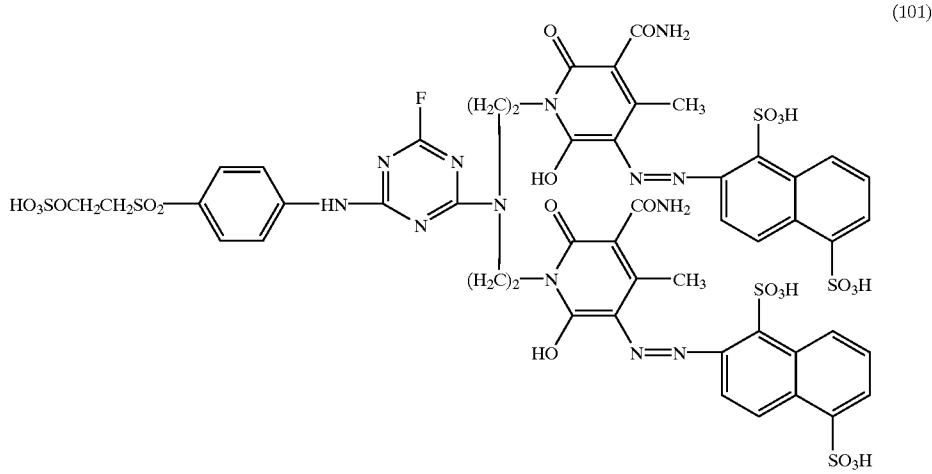

and which dyes cotton in a yellow shade having good allround fastness properties.

EXAMPLES 5 TO 40

In analogy to the procedure described in Examples 3 and 4, dyes of the following general formula (102) are obtained

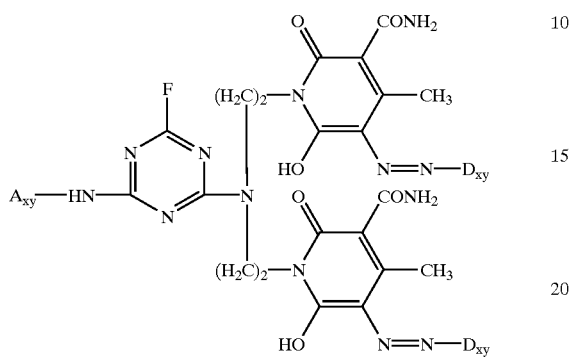

(102)

if the amine of formula $A_{10}$—$NH_2$ is replaced with the equimolar amount of an amine of formula $A_{xy}$—$NH_2$ and/or if the amine of formula $D_{10}$—$NH_2$ is replaced with the equimolar amount of an amine of formula $D_{xy}$—$NH_2$, wherein $A_{xy}$ and $D_{xy}$ each correspond to the radicals listed in Table 2, these radicals each having the meanings cited in Examples 3, 4 and in Table 1. The dyes dye cotton and wool in a yellowish orange shade having good allround fastness properties.

TABLE 1

| Amine $A_{xy}$—$NH_2$ | $A_{xy}$ | Amine $D_{xy}$—$NH_2$ | $D_{xy}$ |
|---|---|---|---|
| $A_{11}$—$NH_2$ | $A_{11}$ = (3-HO$_3$S, 4-SO$_3$H phenyl) | $D_{11}$—$NH_2$ | $D_{11}$ = (1,6-disulfonaphth-2-yl) |
| $A_{12}$—$NH_2$ | $A_{12}$ = (3-HO$_3$S, 4-SO$_3$H phenyl) | $D_{12}$—$NH_2$ | $D_{12}$ = (3-HO$_3$S-4-(4-SO$_3$H-phenylazo)phenyl) |
| $A_{13}$—$NH_2$ | $A_{13}$ = (2-HO$_3$S phenyl) | $D_{13}$—$NH_2$ | $D_{13}$ = (3-HO$_3$S, 4-OCH$_3$ phenyl) |
| $A_{14}$—$NH_2$ | $A_{14}$ = (4-SO$_3$H phenyl) | $D_{14}$—$NH_2$ | $D_{14}$ = (4-SO$_2$CH$_2$CH$_2$OSO$_3$H phenyl) |
| $A_{15}$—$NH_2$ | $A_{15}$ = (1-SO$_3$H, 6-SO$_3$H naphth-2-yl) | $D_{15}$—$NH_2$ | $D_{15}$ = (3-HO$_3$S, 4-SO$_2$CH$_2$CH$_2$OSO$_3$H phenyl) |

TABLE 1-continued
| Amine $A_{xy}$—$NH_2$ | $A_{xy}$ | Amine $D_{xy}$—$NH_2$ | $D_{xy}$ |
|---|---|---|---|
| $A_{16}$—$NH_2$ | $A_{16}$ = 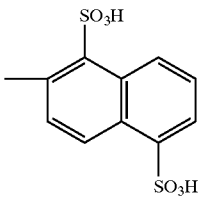 | $D_{16}$—$NH_2$ | $D_{16}$ = 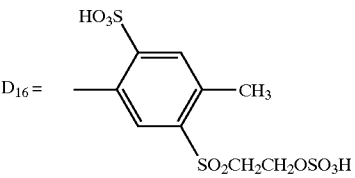 |
| $A_{17}$—$NH_2$ | $A_{17}$ = 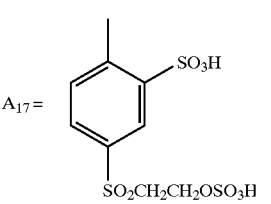 | $D_{17}$—$NH_2$ | $D_{17}$ = 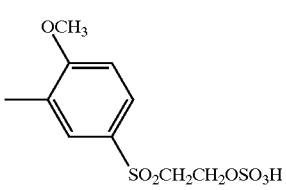 |
| $A_{18}$—$NH_2$ | $A_{18}$ = 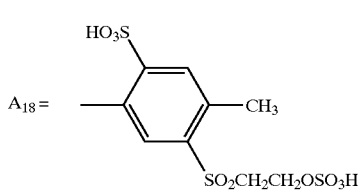 | $D_{18}$—$NH_2$ | $D_{18}$ = 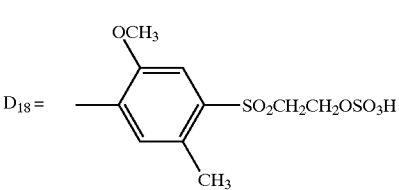 |
| $A_{19}$—$NH_2$ | $A_{19}$ = 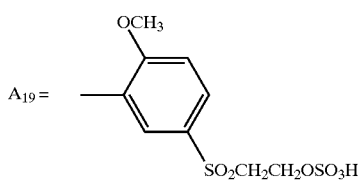 | $D_{19}$—$NH_2$ | $D_{19}$ = 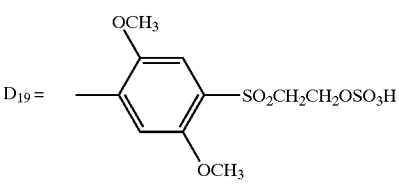 |
| $A_{20}$—$NH_2$ | $A_{20}$ =  | $D_{20}$—$NH_2$ | $D_{20}$ = 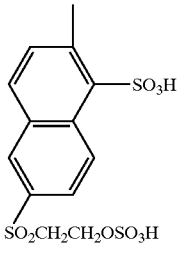 |
| $A_{21}$—$NH_2$ | $A_{21}$ = 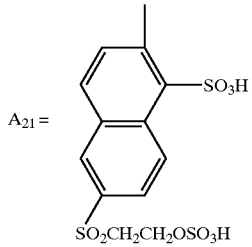 | $D_{21}$—$NH_2$ | $D_{21}$ = 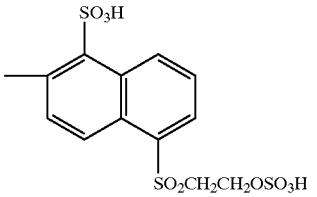 |
| $A_{22}$—$NH_2$ | $A_{22}$ = 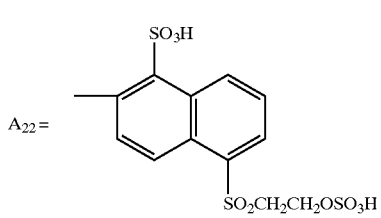 | $D_{22}$—$NH_2$ | $D_{22}$ = 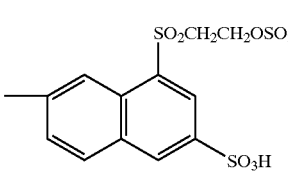 |

TABLE 1-continued

| Amine $A_{xy}$—$NH_2$ | $A_{xy}$ | Amine $D_{xy}$—$NH_2$ | $D_{xy}$ |
|---|---|---|---|
| $A_{23}$—$NH_2$ | $A_{23}$ = 4-methyl-3-sulfo-phenyl-NH-CO-CHBr-CH$_2$Br | $D_{23}$—$NH_2$ | $D_{23}$ = 4-methyl-3-sulfo-phenyl-NH-CO-CHBr-CH$_2$Br |
| $A_{24}$—$NH_2$ | $A_{24}$ = 4-sulfo-3-methyl-phenyl-NH-CO-CHBr-CH$_2$Br | $D_{24}$—$NH_2$ | $D_{24}$ = 4-sulfo-3-methyl-phenyl-NH-CO-CHBr-CH$_2$Br |
| $A_{25}$—$NH_2$ | $A_{25}$ = 4-methyl-phenyl-CONH(CH$_2$)$_2$SO$_2$(CH$_2$)$_2$Cl | $D_{25}$—$NH_2$ | $D_{25}$ = 4-methyl-phenyl-CONH(CH$_2$)$_2$SO$_2$(CH$_2$)$_2$Cl |
| $A_{26}$—$NH_2$ | $A_{26}$ = 4-methyl-3-SO$_3$H-phenyl-CONH(CH$_2$)$_2$SO$_2$(CH$_2$)$_2$Cl | $D_{26}$—$NH_2$ | $D_{26}$ = 4-methyl-3-SO$_3$H-phenyl-CONH(CH$_2$)$_2$SO$_2$(CH$_2$)$_2$Cl |
| $A_{27}$—$NH_2$ | $A_{27}$ = 4-methyl-phenyl-CONH(CH$_2$)$_2$SO$_2$(CH$_2$)$_2$OSO$_3$H | $D_{27}$—$NH_2$ | $D_{27}$ = 4-methyl-phenyl-CONH(CH$_2$)$_2$SO$_2$(CH$_2$)$_2$OSO$_3$H |
| $A_{28}$—$NH_2$ | $A_{28}$ = 4-methyl-3-SO$_3$H-phenyl-CONH(CH$_2$)$_2$SO$_2$(CH$_2$)$_2$OSO$_3$H | $D_{28}$—$NH_2$ | $D_{28}$ = 4-methyl-3-SO$_3$H-phenyl-CONH(CH$_2$)$_2$SO$_2$(CH$_2$)$_2$OSO$_3$H |
| $A_{29}$—$NH_2$ | $A_{29}$ = 3-[CONH(CH$_2$)$_2$SO$_2$(CH$_2$)$_2$OSO$_3$H]-phenyl | $D_{29}$—$NH_2$ | $D_{29}$ = 3-[CONH(CH$_2$)$_2$SO$_2$(CH$_2$)$_2$OSO$_3$H]-phenyl |
| $A_{30}$—$NH_2$ | $A_{30}$ = 4-methyl-3-SO$_3$H-phenyl-NHCO(CH$_2$)$_3$SO$_2$(CH$_2$)$_2$Cl | $D_{30}$—$NH_2$ | $D_{30}$ = 4-methyl-3-SO$_3$H-phenyl-NHCO(CH$_2$)$_3$SO$_2$(CH$_2$)$_2$Cl |

TABLE 1-continued

| Amine $A_{xy}$—$NH_2$ | $A_{xy}$ | Amine $D_{xy}$—$NH_2$ | $D_{xy}$ |
|---|---|---|---|
| $A_{31}$—$NH_2$ | $A_{31}$ = 2-methyl-4-(NHCO(CH$_2$)$_3$SO$_2$(CH$_2$)$_2$Cl)-benzenesulfonic acid | $D_{31}$—$NH_2$ | $D_{31}$ = 2-methyl-4-(NHCO(CH$_2$)$_3$SO$_2$(CH$_2$)$_2$Cl)-benzenesulfonic acid |
| $A_{32}$—$NH_2$ | $A_{32}$ = 3-(CONH—(CH$_2$)$_3$—SO$_2$—(CH$_2$)$_2$—OSO$_3$H)-phenyl | $D_{32}$—$NH_2$ | $D_{32}$ = 4-(2,5,6-trichloropyrimidin-4-ylamino)-2-methylbenzenesulfonic acid |
| $A_{33}$—$NH_2$ | $A_{33}$ = 3-(CONH—(CH$_2$)$_4$—SO$_2$—(CH$_2$)$_2$—OSO$_3$H)-phenyl | $D_{33}$—$NH_2$ | $D_{33}$ = 4-(5-chloro-2,6-difluoropyrimidin-4-ylamino)-2-methylbenzenesulfonic acid |
| | | $D_{34}$—$NH_2$ | $D_{34}$ = 4-(5-cyano-2,6-dichloropyrimidin-4-ylamino)-2-methylbenzenesulfonic acid |
| | | $D_{35a}$—$NH_2$– $D_{35c}$—$NH_2$ = | 4-((4-chloro-6-$T_1$-1,3,5-triazin-2-yl)amino)-2-methylbenzenesulfonic acid |
| | | $D_{36a}$—$NH_2$– $D_{36c}$—$NH_2$ = | 4-((4-chloro-6-$T_1$-1,3,5-triazin-2-yl)amino)-2-methyl-(3-sulfo)benzene |

TABLE 1-continued

| Amine $A_{xy}-NH_2$ | $A_{xy}$ | Amine $D_{xy}-NH_2$ | $D_{xy}$ |
|---|---|---|---|

$T_1$:

$D_{35a}/D_{36a}$ : —NH—C$_6$H$_4$—SO$_2$CH$_2$CH$_2$OSO$_3$H (para)

$D_{35b}/D_{36b}$ : —NH—C$_6$H$_4$—SO$_2$CH$_2$CH$_2$OSO$_3$H (meta)

$D_{35c}/D_{36c}$ : —NH—C$_6$H$_4$—CONH(CH$_2$)$_2$SO$_2$(CH$_2$)$_2$OSO$_3$H (meta)

TABLE 2

| Example | $A_{xy}$ | $D_{xy}$ |
|---|---|---|
| 5 | $A_{10}$ | $D_{11}$ |
| 6 | $A_{10}$ | $D_{12}$ |
| 7 | $A_{10}$ | $D_{13}$ |
| 8 | $A_{17}$ | $D_{11}$ |
| 9 | $A_{17}$ | $D_{12}$ |
| 10 | $A_{17}$ | $D_{13}$ |
| 11 | $A_{18}$ | $D_{11}$ |
| 12 | $A_{18}$ | $D_{12}$ |
| 13 | $A_{18}$ | $D_{13}$ |
| 14 | $A_{19}$ | $D_{11}$ |
| 15 | $A_{19}$ | $D_{12}$ |
| 16 | $A_{19}$ | $D_{13}$ |
| 17 | $A_{20}$ | $D_{11}$ |
| 18 | $A_{20}$ | $D_{13}$ |
| 19 | $A_{21}$ | $D_{11}$ |
| 20 | $A_{21}$ | $D_{13}$ |
| 21 | $A_{22}$ | $D_{11}$ |
| 22 | $A_{22}$ | $D_{13}$ |
| 23 | $A_{23}$ | $D_{11}$ |
| 24 | $A_{23}$ | $D_{13}$ |
| 25 | $A_{24}$ | $D_{11}$ |
| 26 | $A_{24}$ | $D_{13}$ |
| 27 | $A_{25}$ | $D_{11}$ |
| 28 | $A_{25}$ | $D_{13}$ |
| 29 | $A_{26}$ | $D_{11}$ |
| 30 | $A_{26}$ | $D_{13}$ |
| 31 | $A_{27}$ | $D_{11}$ |
| 32 | $A_{27}$ | $D_{13}$ |
| 33 | $A_{28}$ | $D_{11}$ |
| 34 | $A_{28}$ | $D_{13}$ |
| 35 | $A_{29}$ | $D_{11}$ |
| 36 | $A_{29}$ | $D_{12}$ |
| 37 | $A_{30}$ | $D_{11}$ |
| 38 | $A_{30}$ | $D_{13}$ |
| 39 | $A_{31}$ | $D_{11}$ |
| 40 | $A_{31}$ | $D_{12}$ |

EXAMPLE 41

20.3 Parts of cyanuric chloride are thoroughly stirred in 150 parts of water with addition of a wetting agent at a temperature from 0° C. 27.8 Parts of aniline-2,5-disulfonic acid ($A_{11}-NH_2$) are added to this mixture. The temperature is kept for 5 hours at 0 to 5 ° C. and the pH is kept at 3 to 4 by addition of 2 N sodium hydroxide solution. The pH is then adjusted to 7 and the mixture is clarified by filtration. The resulting filtrate is charged over 2.5 hours with 40.5 parts of the compound obtained according to Example 1, the pH being kept at 7.5 to 8.5 by addition of a 2 N sodium hydroxide solution, the temperature rising to 36° C. To complete the reaction, the mixture is stirred for one hour at room temperature and the pH is then adjusted to 7 with 2 N hydrochloric acid. This yields 714 parts of a solution containing a compound which, in the form of the free acid, corresponds to formula

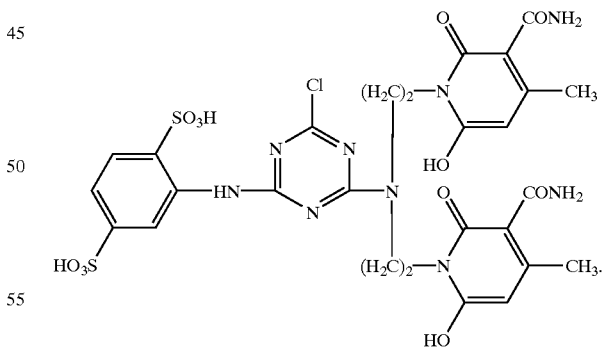

EXAMPLE 42

A neutral solution of 14.1 parts of an amine of formula $D_{14}-NH_2$ in 120 parts of water, wherein $D_{14}$ is a radical of formula

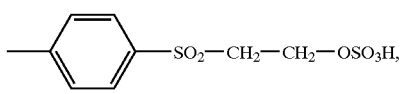

is charged with 12.5 parts of a 4 N sodium nitrite solution. A mixture consisting of 30 parts of ice/water and 12.5 parts of conc. hydrochloric acid is added to this solution at 0° C. The reaction mixture is stirred for one hour at 0 to 5° C. and is then added to 179 parts of the solution obtained according to Example 41 at 5 to 7° C., the pH being adjusted over 30 minutes to 6 with sodium hydrogencarbonate. To complete the reaction, the mixture is stirred for another 30 minutes at 7 to 15° C. The resulting solution is freed from salt by dialysis and concentrated by evaporation. This yields 24.2 parts of a compound which, in the form of the free acid, corresponds to formula (103)

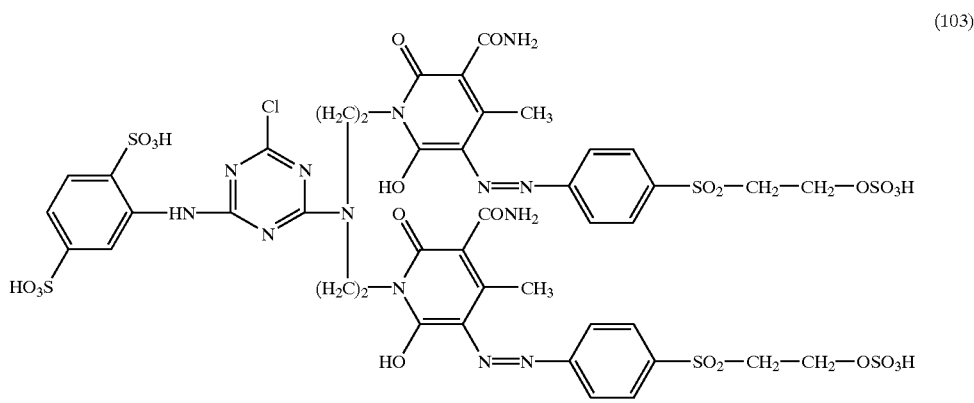

(103)

and which dyes cotton in a yellow shade having good allround fastness properties.

EXAMPLES 43 TO 75

In analogy to the procedure described in Examples 41 and 42, the dyes of the following general formula (104) are obtained

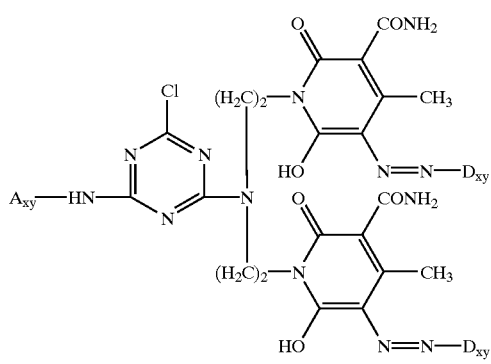

(104)

if aniline-2,5-disulfonic acid ($A_{11}$—$NH_2$) is replaced with the equimolar amount of an amine of formula $A_{xy}$—$NH_2$ and/or if an amine of formula $D_{14}$—$NH_2$ is replaced with the equimolar amount of an amine of formula $D_{xy}$—$NH_2$, wherein $A_{xy}$ and $D_{xy}$ each correspond to the radicals listed in Table 3, each of these radicals having the meanings cited in Table 1. The dyes dye cotton and wool in a yellowish orange shade having good allround fastness properties.

TABLE 3

| Example | $A_{xy}$ | $D_{xy}$ |
|---|---|---|
| 43 | $A_{11}$ | $D_{20}$ |
| 44 | $A_{11}$ | $D_{21}$ |
| 45 | $A_{11}$ | $D_{22}$ |
| 46 | $A_{11}$ | $D_{17}$ |
| 47 | $A_{11}$ | $D_{18}$ |
| 48 | $A_{11}$ | $D_{25}$ |
| 49 | $A_{11}$ | $D_{27}$ |
| 50 | $A_{11}$ | $D_{29}$ |
| 51 | $A_{11}$ | $D_{19}$ |
| 52 | $A_{12}$ | $D_{20}$ |
| 53 | $A_{15}$ | $D_{15}$ |
| 54 | $A_{15}$ | $D_{16}$ |

TABLE 3-continued

| Example | $A_{xy}$ | $D_{xy}$ |
|---|---|---|
| 55 | $A_{15}$ | $D_{23}$ |
| 56 | $A_{15}$ | $D_{24}$ |
| 57 | $A_{15}$ | $D_{26}$ |
| 58 | $A_{16}$ | $D_{28}$ |
| 59 | $A_{16}$ | $D_{16}$ |
| 60 | $A_{13}$ | $D_{15}$ |
| 61 | $A_{13}$ | $D_{16}$ |
| 62 | $A_{13}$ | $D_{23}$ |
| 63 | $A_{13}$ | $D_{24}$ |
| 64 | $A_{13}$ | $D_{26}$ |
| 65 | $A_{13}$ | $D_{28}$ |
| 66 | $A_{13}$ | $D_{30}$ |
| 67 | $A_{13}$ | $D_{31}$ |
| 68 | $A_{14}$ | $D_{15}$ |
| 69 | $A_{14}$ | $D_{16}$ |
| 70 | $A_{11}$ | $D_{35a}$ |
| 71 | $A_{11}$ | $D_{35b}$ |
| 72 | $A_{11}$ | $D_{36a}$ |
| 73 | $A_{12}$ | $D_{36c}$ |
| 74 | $A_{12}$ | $D_{33}$ |
| 75 | $A_{11}$ | $D_{34}$ |

EXAMPLE 76

30.4 Parts of aniline-2,5-disulfonic acid ($A_{11}$—$NH_2$) are dissolved in 300 parts of water until neutral and a solution of 1.5 g of disodium hydrogenphosphate in 20 parts of water is added. This solution is charged at a temperature below 2° C. and at pH 6.8 with 17 parts of cyanuric fluoride, the pH being kept constant by addition of 2 N sodium hydroxide solution. The solution so obtained is charged with 21.1 parts of the compound obtained according to Example 2 over 2 hours, the pH being kept at 7.5 to 8.5 with a 2 N sodium hydroxide solution and the temperature rising to 22° C. This yields 648 parts of a solution which contains a compound of formula

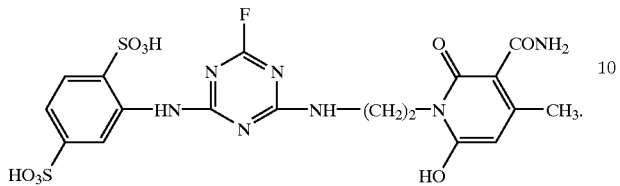

EXAMPLE 77

A neutral solution of 25.2 parts of an amine of formula $D_{35a}$—$NH_2$ in 300 parts of water, wherein $D_{35a}$ is a radical of formula

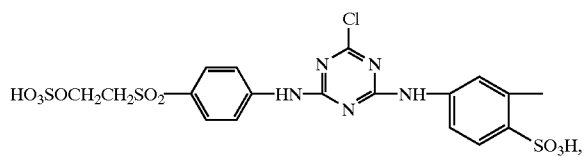

is charged with 44 parts of a 1 N sodium nitrite solute. The pH of this solution is adjusted to 1.6 at 0° C. with 2 N hydrochloric acid and the solution is stirred for one hour at 0 to 5° C. This mixture is charged at 2° C. with 285 parts of the solution obtained according to Example 76. The pH is adjusted over 30 minutes with a 20% sodium carbonate solution to 8.5 and, after the reaction is complete, with 2 N hydrochloric acid to 6.4. The resulting solution is charged with 280 parts of acetone and 90 parts of potassium chloride. The precipitate is subjected to filtration and is then washed with acetone and dried. This yields 41.3 parts of a compound which, in the form of the free acid, corresponds to formula (105)

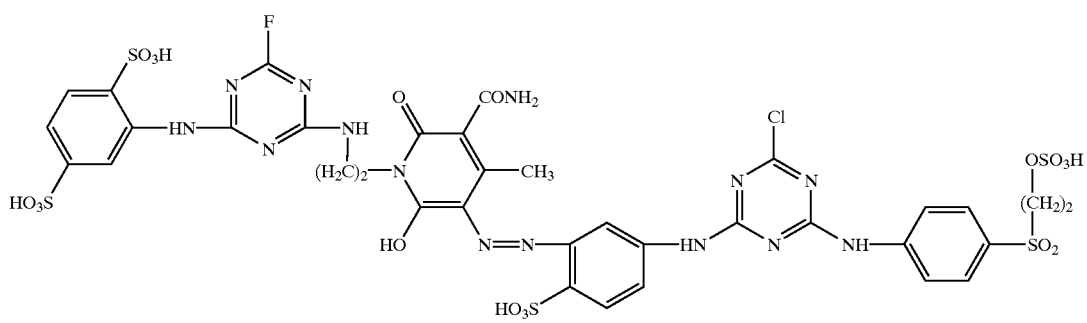

and which dyes cotton in a yellow shade having good allround fastness properties.

EXAMPLES 78 TO 102

In analogy to the procedure described in Examples 76 and 77, the dyes following general formula are obtained (106)

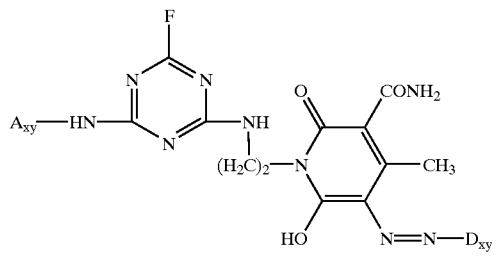

if aniline-2,5-disulfonic acid ($A_{11}$—$NH_2$) is replaced with the equimolar amount of an amine of formula $A_{xy}$—$NH_2$ and/or if an amine of formula $D_{35a}$—$NH_2$ is replaced with the equimolar amount of an amine of formula $D_{xy}$—$NH_2$, wherein $A_{xy}$ and $D_{xy}$ each correspond to the radicals listed in Table 4, which radicals have the meanings cited in the Examples 3 and 4 and in Table 1. The dyes dye cotton and wool in a yellowish orange shade having good allround fastness properties.

TABLE 4

| Example | $A_{xy}$ | $D_{xy}$ |
|---|---|---|
| 78 | $A_{11}$ | $D_{36a}$ |
| 79 | $A_{11}$ | $D_{35b}$ |
| 80 | $A_{11}$ | $D_{35c}$ |
| 81 | $A_{12}$ | $D_{36a}$ |
| 82 | $A_{11}$ | $D_{23}$ |
| 83 | $A_{11}$ | $D_{24}$ |
| 84 | $A_{11}$ | $D_{14}$ |
| 85 | $A_{15}$ | $D_{15}$ |
| 86 | $A_{11}$ | $D_{17}$ |
| 87 | $A_{10}$ | $D_{10}$ |
| 88 | $A_{10}$ | $D_{12}$ |
| 89 | $A_{29}$ | $D_{10}$ |
| 90 | $A_{32}$ | $D_{11}$ |
| 91 | $A_{13}$ | $D_{15}$ |
| 92 | $A_{13}$ | $D_{16}$ |
| 93 | $A_{14}$ | $D_{23}$ |
| 94 | $A_{13}$ | $D_{26}$ |
| 95 | $A_{13}$ | $D_{28}$ |

TABLE 4-continued

| Example | $A_{xy}$ | $D_{xy}$ |
|---|---|---|
| 96 | $A_{13}$ | $D_{32}$ |
| 97 | $A_{13}$ | $D_{34}$ |
| 98 | $A_{11}$ | $D_{18}$ |

TABLE 4-continued

| Example | $A_{xy}$ | $D_{xy}$ |
|---------|----------|----------|
| 99 | $A_{17}$ | $D_{13}$ |
| 100 | $A_{17}$ | $D_{11}$ |
| 101 | $A_{18}$ | $D_{10}$ |
| 102 | $A_{33}$ | $D_{10}$ |

Dyeing Instruction I

100 Parts of cotton fabric are placed at 60° C. in 1500 parts of a dye liquor containing 45 g/l of sodium chloride and 2 parts of the reactive dye obtained according to Example 4. After 45 minutes at 60° C., 20 g/l of calcined sodium carbonate are added. Dyeing is continued for another 45 minutes at this temperature. The dyed goods are then rinsed, soaped at the boil for a quarter of an hour with a non-ionic detergent, rinsed again and dried.

Alternatively to the above instruction, it is also possible to dye at 80° C. instead of at 60° C.

Dyeing Instruction II 0.1 Part of the dye of Example 4 is dissolved in 200 parts of water and then 0.5 part of sodium sulfate, 0.1 part of a levelling agent (based on the condensate from a higher aliphatic amine and ethylene oxide) and 0.5 part of sodium acetate are added. The pH is then adjusted to 5.5 with acetic acid (80%). The dye bath is heated for 10 minutes to 50° C. and 10 parts of a wool fabric are then added. The dye bath is then heated over about 50 minutes to 100° C. and dyeing is carried out at this temperature for 60 minutes. The dye bath is then allowed to cool to 90° C. and the dyed goods are taken out. The wool fabric is washed with warm and cold water and is then spun and dried.

Printing Instruction

3 Parts of the dye obtained in Example 4 are sprinkled, with rapid stirring, into 100 parts of a stock thickening which contains 50 parts of 5 % sodium alginate thickening, 27.8 parts of water, 20 parts of urea, 1 part of sodium m-nitrobenzenesulfonate and 1.2 parts of sodium hydrogen carbonate. A cotton fabric is printed with the printing paste so obtained and dried. The printed fabric is steamed for 2 minutes at 102° C. in saturated steam, then rinsed, if necessary soaped at the boil, then rinsed once more and subsequently dried.

What is claimed is:

1. A reactive dye of formula (1)

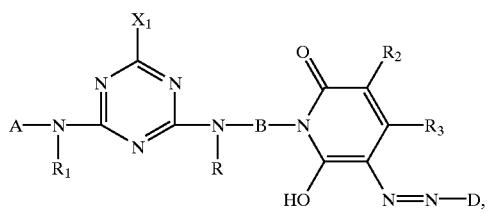

(1)

wherein

A is phenyl or naphthyl, each of which is unsubstituted or substituted by halogen, $C_1$–$C_4$alkyl, $C_1$–$C_4$alkoxy, carboxy, sulfo or a fibre-reactive group of formula (2a), (2b), (2c), (2d) or (2e)

—SO$_2$—Y (2a),

—NH—CO—(CH$_2$)$_l$—SO$_2$—Y (2b),

—CONH—(CH$_2$)$_m$—SO$_2$—Y (2c),

—NH—CO—CH(Hal)—CH$_2$Hal (2d)

or

—NH—CO—C(Hal)═CH$_2$ (2e),

B is an aliphatic linking group,

D is the radical of a diazo component of the benzene or naphthalene series, $R_1$ is hydrogen or unsubstituted or substituted $C_1$–$C_4$alkyl, $R_2$ is hydrogen, cyano, carbamoyl or sulfomethyl, $R_3$ is hydrogen or $C_1$–$C_4$alkyl, R corresponds to a radical of formula (3)

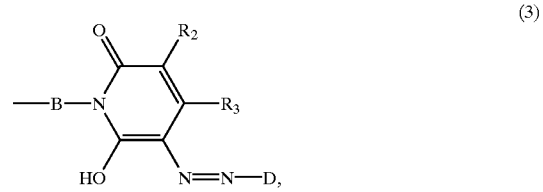

(3)

wherein B, D, $R_2$ and $R_3$ have the meanings cited above, $X_1$ is halogen, hydroxy, $C_1$–$C_4$alkoxy, unsubstituted or substituted $C_1$–$C_4$alkylthio or unsubstituted or substituted amino, or a N-heterocycle which may contain additional heteroatoms, Hal is chloro or bromo, Y is vinyl or a —CH$_2$—CH$_2$—U radical, U is a group which is removable with alkali, and l and m are each independently of the other the number 2, 3 or 4.

2. A reactive dye according to claim 1, wherein

A is phenyl which is substituted by 1 to 2 identical or different substituents selected from the group consisting of methyl, methoxy, sulfo and a fibre-reactive group of formula (2a), wherein Y is vinyl or β-sulfatoethyl.

3. A reactive dye according to claim 1, wherein

B is straight-chain or branched $C_2$–$C_6$alkylene.

4. A reactive dye according to claim 1, wherein $R_1$ is hydrogen or $C_1$–$C_4$alkyl.

5. A reactive dye according to claim 1, wherein $R_1$ is hydrogen.

6. A reactive dye according to claim 1, wherein $R_2$ is carbamoyl or sulfomethyl, and $R_3$ is $C_1$–$C_4$alkyl.

7. A process for the preparation of a reactive dye according to claim 1, which comprises reacting about 1 molar equivalent each of an amine of formula (8)

(8)

of a compound of formula (9)

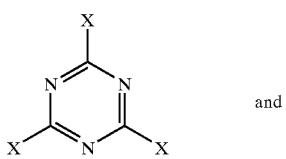
(9)

and of a compound of formula (10)

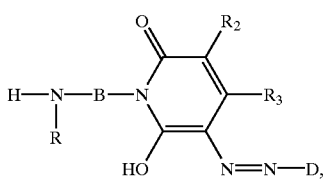
(10)

in any sequence with each other, wherein A, B, D, $R_1$, $R_2$, $R_3$ and R have the meanings given in claim 1 and X is halogen.

8. A reactive dye according to claim 1, wherein $X_1$ is chloro or fluoro.

9. A reactive dye according to claim 1, wherein at least one of A and D contains a fibre-reactive group.

10. A reactive dye according to claim 1, wherein D is a radical of formula (7) or (6j')

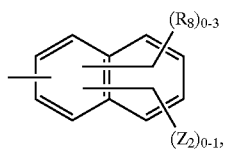
(7)

wherein
($R_8$)$_{0-3}$ is 0 to 3 identical or different substituents selected from the group consisting of halogen, $C_1$–$C_4$alkyl, $C_1$–$C_4$alkoxy, carboxy and sulfo,
$Z_2$ may be a radical of formula (2a), (2b), (2c), (2d), (2e), (2f) or (2g)

—$SO_2$—Y  (2a),

—NH—CO—($CH_2$)$_l$—$SO_2$—Y  (2b),

—CONH—($CH_2$)$_m$—$SO_2$—Y  (2c),

—NH—CO—CH(Hal)—$CH_2$Hal  (2d),

—NH—CO—C(Hal)=$CH_2$  (2e),

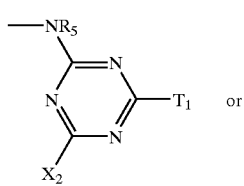
(2f)

or

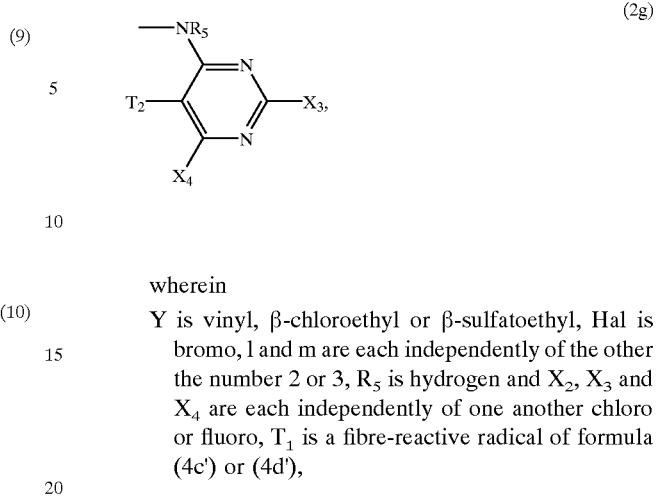
(2g)

wherein
Y is vinyl, β-chloroethyl or β-sulfatoethyl, Hal is bromo, l and m are each independently of the other the number 2 or 3, $R_5$ is hydrogen and $X_2$, $X_3$ and $X_4$ are each independently of one another chloro or fluoro, $T_1$ is a fibre-reactive radical of formula (4c') or (4d'),

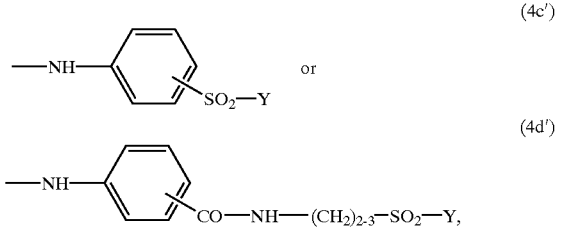
(4c')

or

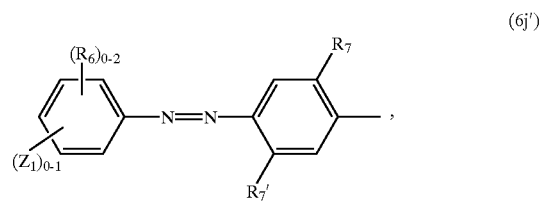
(4d')

wherein Y is vinyl or β-sulfatoethyl, and $T_2$ is cyano or chloro; or

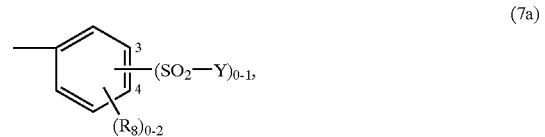
(6j')

wherein
$Z_1$ may be a radical of formula (2a),
wherein Y is vinyl or β-sulfatoethyl,
($R_6$)$_{0-2}$ is 0 to 2 identical or different substituents from the $C_1$–$C_4$alkyl, $C_1$–$C_4$alkoxy, halogen, carboxy and sulfo group,
$R_7$ is hydrogen, sulfo, or $C_1$–$C_4$alkoxy which is unsubstituted or substituted in the alkyl moiety by hydroxy or sulfato, and
$R_7{}'$ is hydrogen, $C_1$–$C_4$alkyl, $C_1$–$C_4$alkoxy, $C_2$–$C_4$alkanoylamino or ureido.

11. A reactive dye according to claim 1, wherein D corresponds to a radical of formula (7a), (7b), (7c), (7d) or (7e)

(7a)

-continued

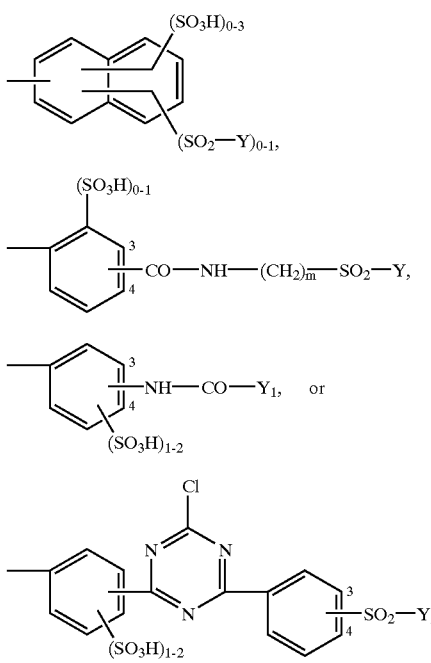

wherein ($R_8$)$_{0-2}$ is 0 to 2 identical or different substituents selected from the group consisting of halogen, $C_1$–$C_4$alkyl, $C_1$–$C_4$alkoxy and sulfo, $Y_1$ is a —CH(Br)—CH$_2$—Br or —C(Br)=CH$_2$ radical, Y is vinyl, β-chloroethyl or β-sulfatoethyl, and m is the number 2 or 3.

12. A reactive dye according to claim 11, which corresponds to formula (1a)

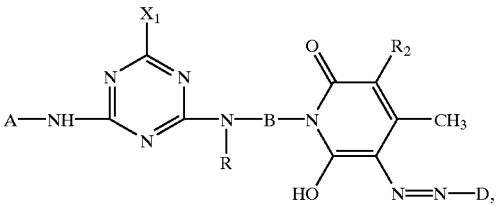

wherein
- A is phenyl which is substituted by 1 to 2 identical or different substituents selected from the group consisting of methyl, methoxy, sulfo and the fibre-reactive group of formula —SO$_2$—Y (2a), wherein Y is vinyl or β-sulfatoethyl,
- B is straight-chain or branched $C_2$–$C_6$alkylene,
- D corresponds to a radical of formula (7a), (7b), (7c), (7d) or (7e), wherein ($R_8$)$_{0-2}$, Y, $Y_1$ and m have the meanings given in claim 11,
- $R_2$ is carbamoyl or sulfomethyl,
- R corresponds to a radical of formula (3a)

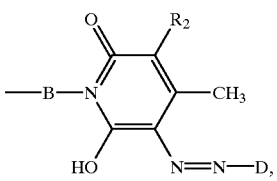

wherein B, D and $R_2$ have the meanings cited above, and $X_1$ is chloro or fluoro.

13. A process for dyeing or printing a fibre material containing hydroxyl groups or nitrogen, which comprises applying to said fibre material a reactive dye of formula (1) according to claim 1.

14. A process according to claim 13, wherein said fibre material is cellulosic fibre material.

15. A process according to claim 13, wherein said fibre material is cotton.

* * * * *